United States Patent [19]

Montalvo, III et al.

[11] Patent Number: 4,860,865
[45] Date of Patent: Aug. 29, 1989

[54] QUICK RELEASE, HIGH TORQUE, FRICTION BRAKES AND CLUTCHES

[75] Inventors: William W. Montalvo, III, Raymond; Philip R. Metcalf, Jr., West Brook, both of Me.

[73] Assignee: The Montalvo Corporation, Portland, Me.

[21] Appl. No.: 95,301

[22] Filed: Sep. 10, 1987

[51] Int. Cl.⁴ ............... F16D 13/40; F16D 55/04
[52] U.S. Cl. ................. 192/70; 192/85 AB; 192/110 B; 192/113 A; 192/DIG. 1; 188/71.3; 188/73.32; 188/73.39
[58] Field of Search ............. 192/70, 70.13, 85 AB, 192/110 B, 113 A, DIG. 1; 188/71.3, 71.4, 73.32, 73.39, 218; 403/335, 337, 360, 362

[56] References Cited

U.S. PATENT DOCUMENTS

| | | | |
|---|---|---|---|
| 2,762,460 | 9/1956 | Butler | 188/71.3 |
| 2,808,129 | 10/1957 | Kraus | 192/70 |
| 3,388,775 | 6/1968 | Baynes et al. | 188/73.32 |
| 3,425,518 | 2/1969 | Morrow | 192/70 |
| 3,885,650 | 5/1975 | Klaue | 188/71.4 |
| 3,889,784 | 6/1975 | Hanks | 192/70 |
| 4,569,428 | 2/1986 | Forsythe et al. | 192/85 AB |

FOREIGN PATENT DOCUMENTS 1235678 10/1963 Fed. Rep. of Germany ..... 188/71.3
3440324 5/1986 Fed. Rep. of Germany ...... 188/264 AA Primary Examiner—Leslie A. Braun
Assistant Examiner—David A. Testardi
Attorney, Agent, or Firm—Brooks, Haidt, Haffner & Delahunty

[57] ABSTRACT

A brake or clutch has a pair of opposed, finned, heat dissipating discs between which are mounted back-to-back pistons for forcing generally kidney-shaped friction pads into engagement with inner surfaces of the discs. The friction pads are readily removable by loosening a thumbscrew which holds a torque post in locking position and rotating the torque post to an unlocked position. A fin arrangement for good heat dissipation and a novel hub arrangement are shown.

17 Claims, 6 Drawing Sheets

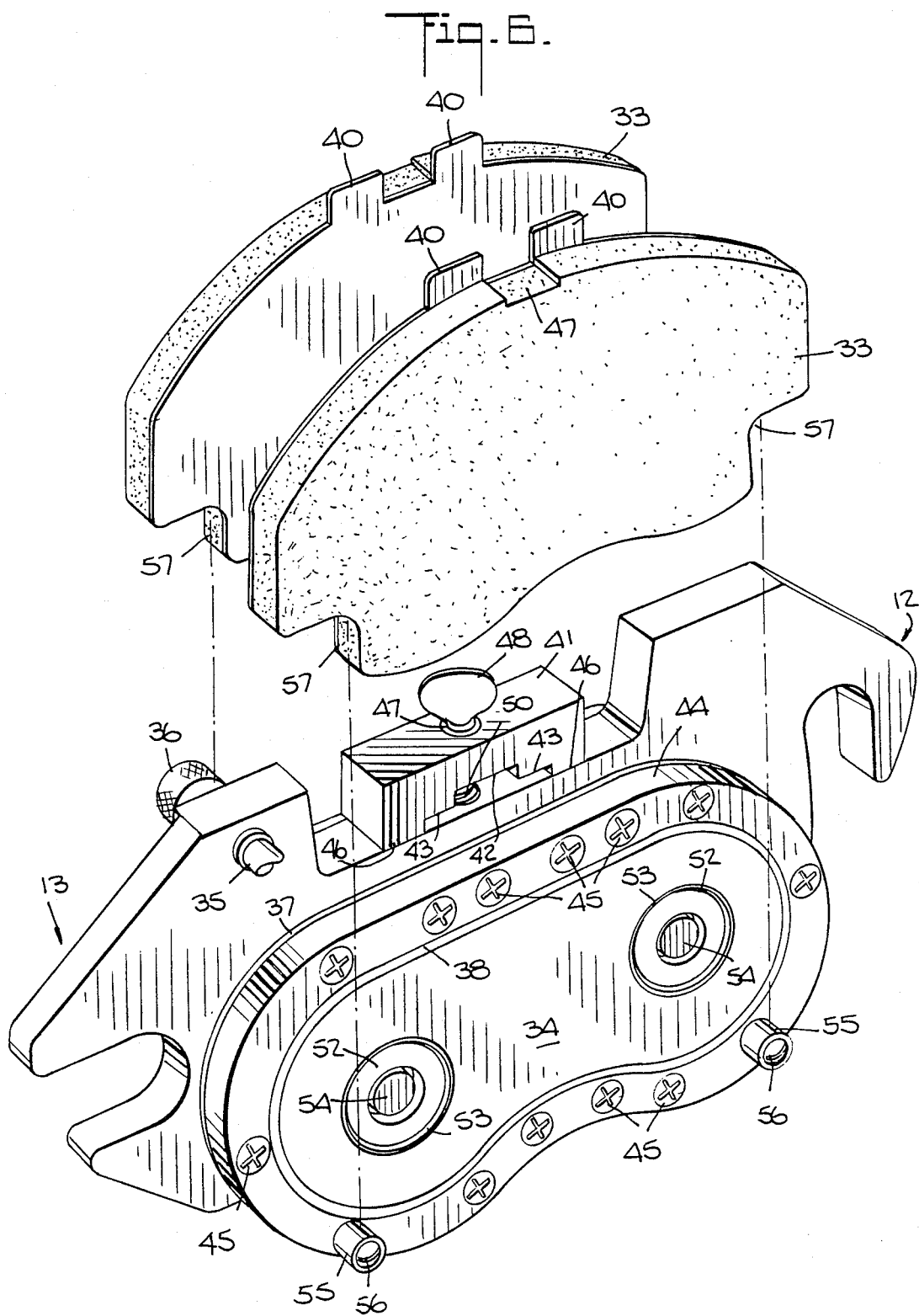

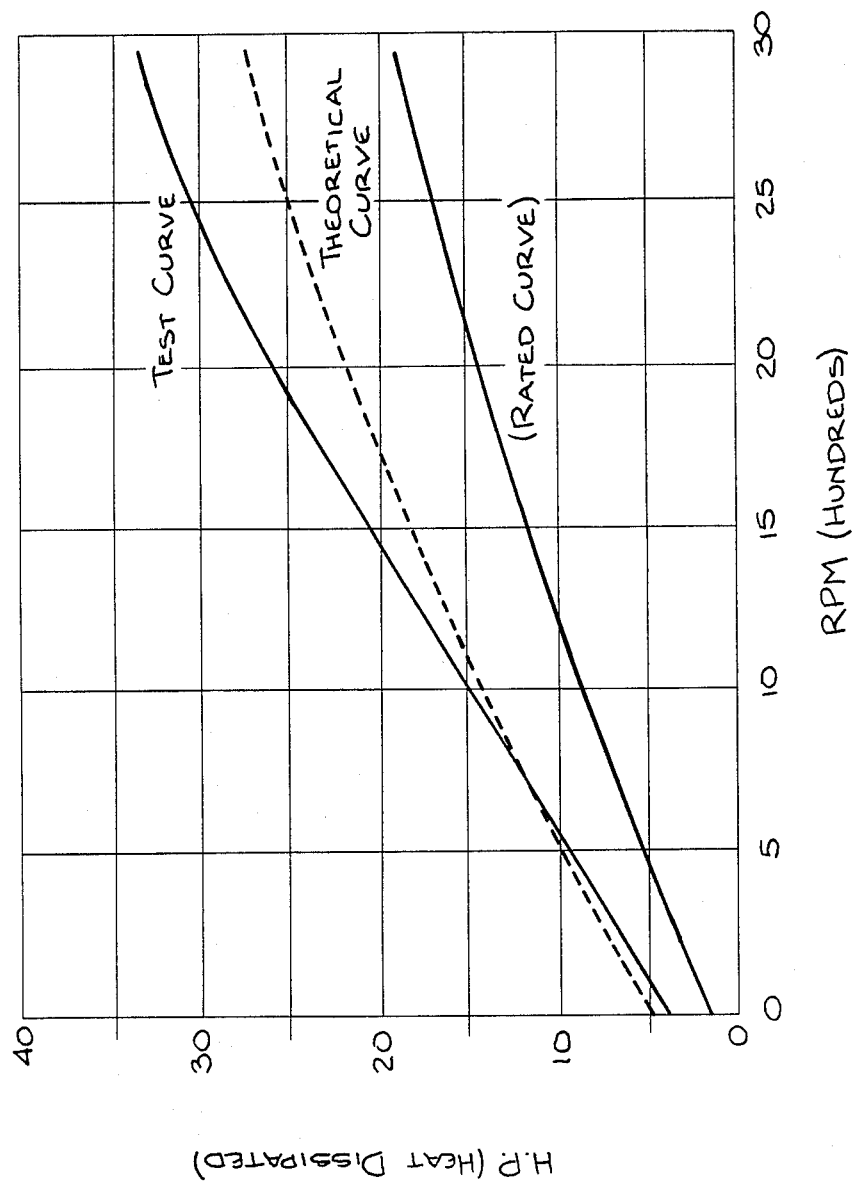

QUICK RELEASE, HIGH TORQUE, FRICTION BRAKES AND CLUTCHES

BACKGROUND OF THE INVENTION

1. Field of the Invention

The invention relates to brakes and clutches of the type wherein fluid-actuated cylinder assemblies force friction members outwardly to engage spaced, opposed, discs.

2. Discussion of the Prior Art

Friction brakes and clutches having pivoted and removable friction modules for easy access to working parts for inspection and maintenance have been described in Montalvo U.S. Pat. No. 3,696,900 granted Oct. 10, 1972 and Montalvo, Jr. U.S. Pat. No. 3,964,583 granted June 22, 1976. Another arrangement for allowing access to friction members in industrial brakes and clutches is described in Forsythe et al. U.S. Pat. No. 4,569,428, granted Feb. 11, 1986, and a caliper type brake with a quick change shoe assembly is shown in Baynes et al U.S. Pat. No. 3,388,775.

Various arrangements of heat dissipating fins have been proposed for use in brake discs, and brake drums with different configurations of air passages are shown in the prior art, as for example, in Knapp U.S. Pat. No. 3,312,414 granted Apr. 4, 1967.

SUMMARY OF THE INVENTION

The present invention has several purposes. The first is to maximize the force that can be generated for torque in a brake or clutch of the kind having friction members which are driven outwards to engage discs which are rotatable with respect to the friction members. The high torque achieved requires improved heat dissipation, which is provided by a unique disc design, with heat radiating fins configured for optimum heat dissipating efficiency. The fins provide reduction of turbulence and boundary layer obstruction so that air flow over the disc is maximized. Provision is also made for quick and easy access to moving parts and especially to friction pads which are subject to wear. A new hub and cylinder module mounting arrangement cooperate to assure easy installation and maintenance. Also disclosed is a novel unitary friction module.

Instead of having two pairs of piston and cylinder assemblies mounted back-to-back in each friction module as in prior brakes and clutches, such as those of U.S. Pat. No. 3,696,583, each friction module of the device of this invention can carry a single pair of back-to-back pistons for actuation of generally kidney-shaped friction pads, which engage a considerably larger area of the opposed friction discs to increase the torque applied for braking or clutch engagement. The friction pads are arranged to be removed easily without the use of tools. A thumbscrew or other releasable fastener with associated pad retaining means keeps the pads in place against centrifugal, tangential or radial forces during operation, yet permits easy removal and replacement of worn pads when necessary. Another type of module carries a plurality of piston pairs.

The discs have a pattern of projecting fins to optimize heat dissipation and enhance the flow of cooling air over the discs while maintaining the strength necessary for safe, reliable operation.

A mounting arrangement is also shown which uses a novel hub and bearing system to keep a unitary friction module centered between the opposed discs.

All of these features cooperate to provide a highly effective brake or cylinder which is easy to install and service.

The invention will be more fully understood when the following detailed description of preferred embodiments is read with reference to the accompanying drawing figures.

BRIEF DESCRIPTION OF THE DRAWINGS

In the several figures of drawing like parts bear like reference numerals.

FIG. 6 is a view in perspective showing how pads of friction material can be removed for inspection and/or replacement.

FIG. 7 is a graph illustrating the improved performance of a typical brake according to the invention.

DETAILED DESCRIPTION OF A PREFERRED EMBODIMENT OF THE INVENTION

Figure 1:
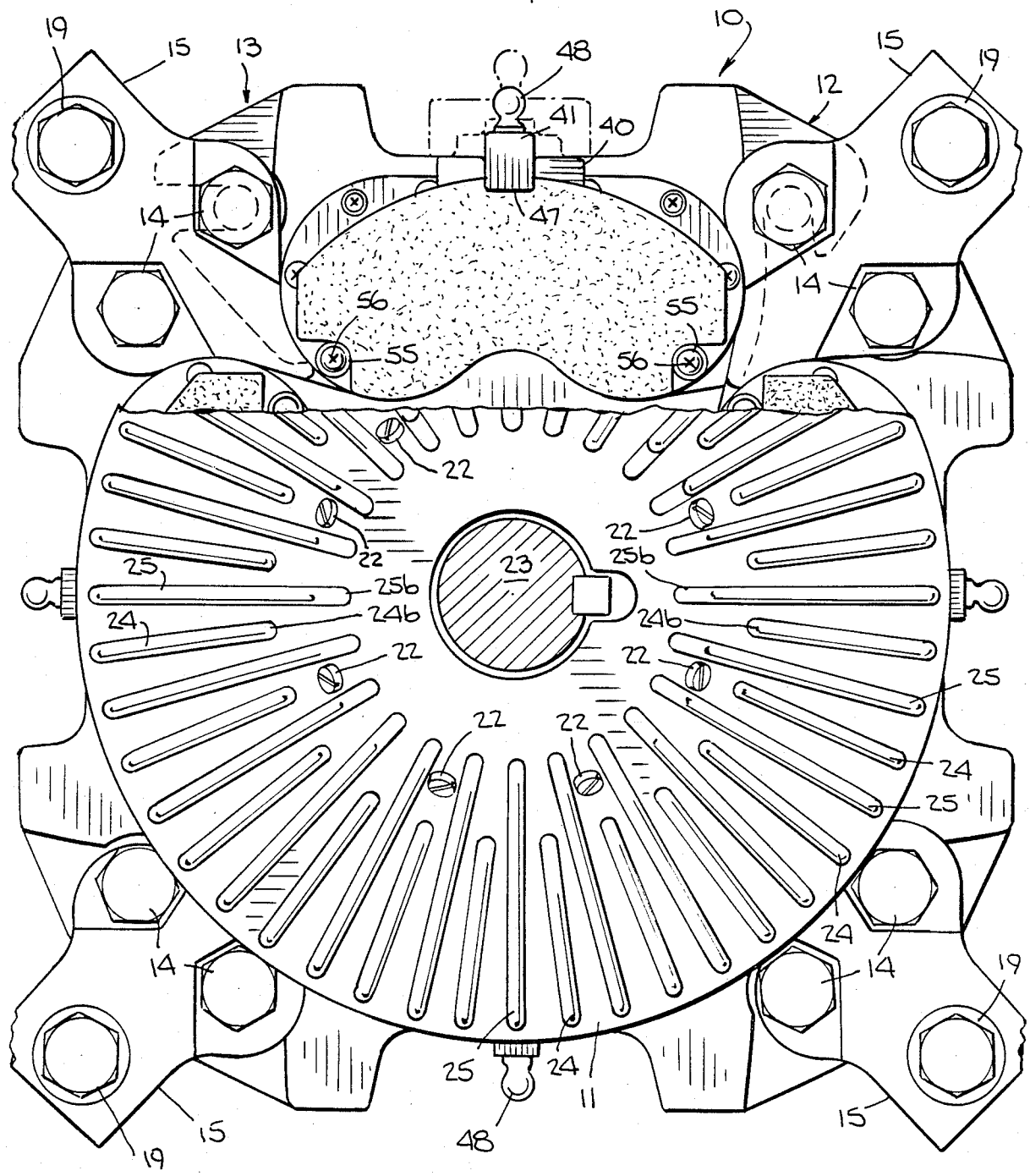
FIG. 1 is a view in elevation of the assembly of the invention, with part of a disc broken away to show a friction module.
Figure 2:
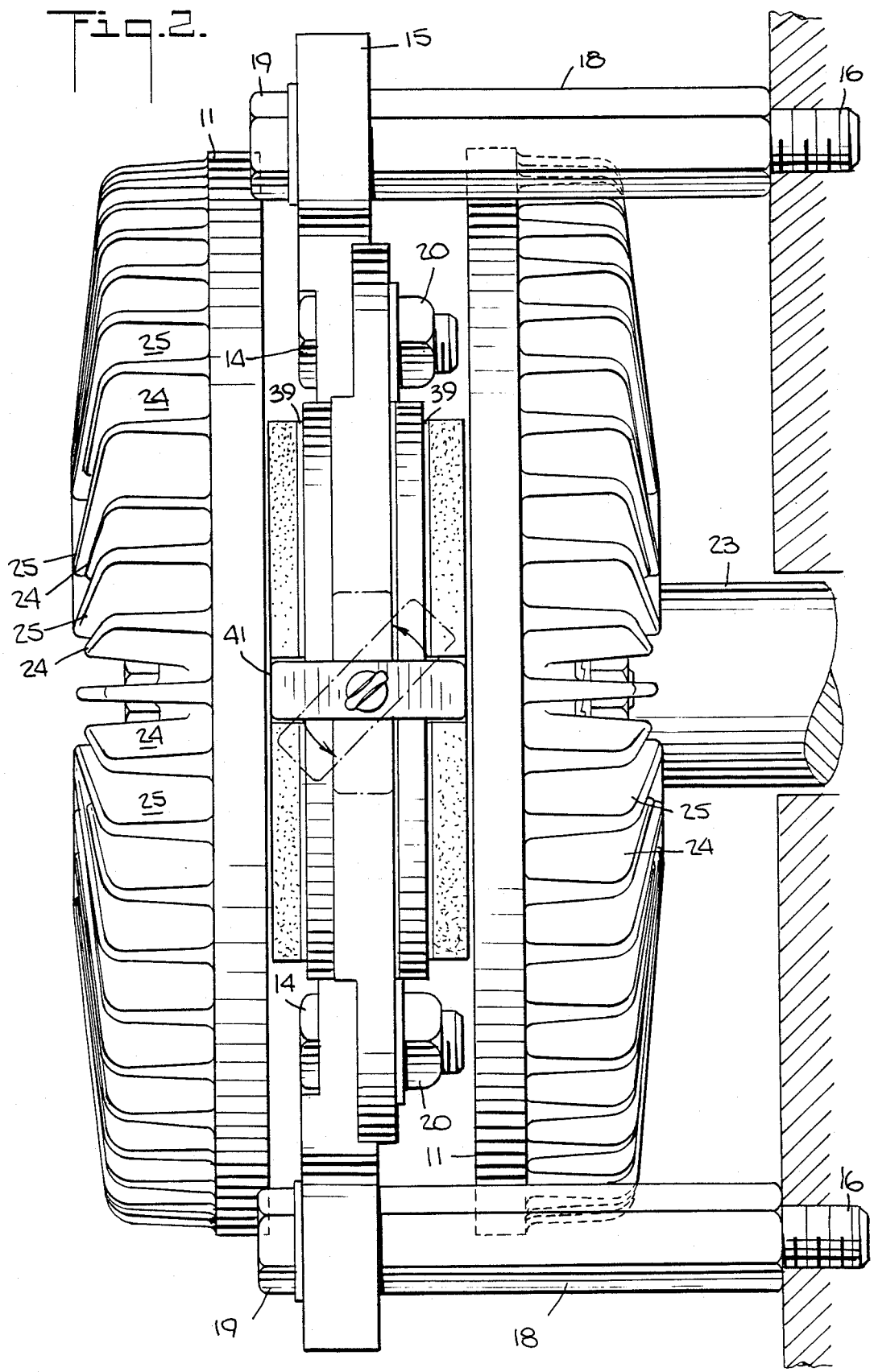
FIG. 2 is a side view of the assembly of FIG. 1.

FIGS. 1 and 2 show that the brake or clutch of the invention generally resembles the assembly described and shown in U.S. Pat. No. 3,964,583, with a plurality (four shown) of friction modules 10 and disposed between a pair of disc-shaped friction plates 11. Each module 10 is shown as having means defining a hook at one module end 12 and means defining a slot at the other end 13 of the module, as in U.S. Pat. No. 3,964,583. The modules could, if desired, have hooks at both ends as in U.S. Pat. No. 3,696,900 to permit removal of the modules from the assembly upon loosening or removal of mounting bolts 14 which secure the modules to adapter members 15 which members are in turn fastened by mounting studs 16 to a fixture such as a machine frame 17 shown in FIG. 2 for operation of the device as a brake. For use of the assembly as a clutch, it will be understood that the modules 10 would be secured to another structure which is also rotatable about the same axis as the plates 11. The modules 10 are pivotable and removable in the same manner as those shown in U.S. Pat. No. 3,964,583, but unlike the assembly of that prior patent, it is not necessary to loosen or remove mounting bolts to gain access to friction pads of the brake or clutch.

Each mounting stud is shown to be surrounded by a cylindrical mounting spacer 18 and the adapter members 15 are secured by nuts 19. The mounting bolts 14 of the modules 10 are held by nuts 20 as shown in FIG. 2, about which the modules 10 can be pivoted (at ends 13) and from which the pods 10 can be released (at ends 12) as in U.S. Pat. No. 3,964,583.

Figure 3:
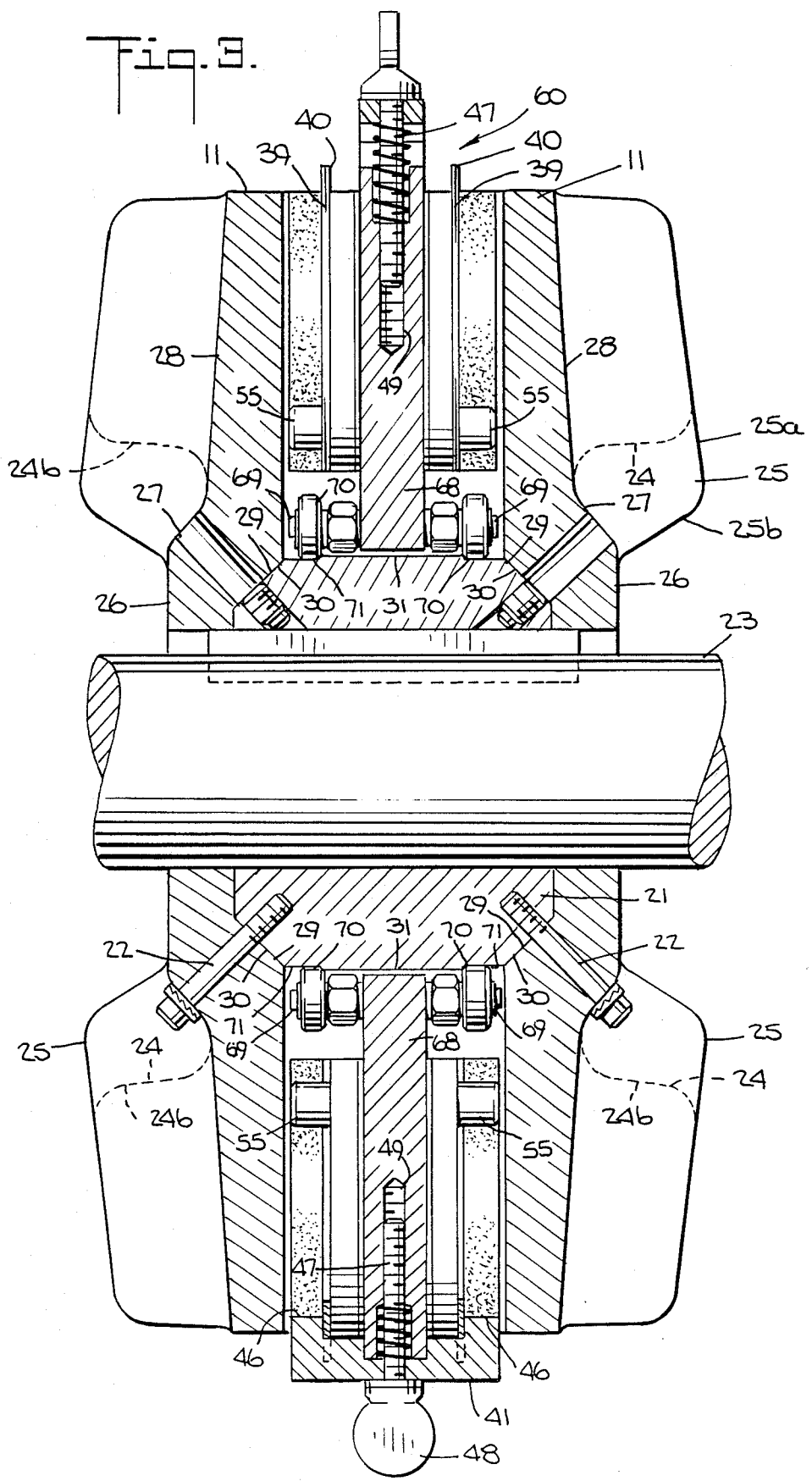
FIG. 3 is a view in section of an assembly according to the invention.

The friction discs 11 are secured to a hub 21 by a plurality of bolts 22 as shown best in FIGS. 1 and 3 and he hub 21 is keyed to a shaft 23 for rotation with the shaft 23. When engaged by friction members carried by the modules 10, the friction discs 11 have to dissipate considerable heat, and accordingly the discs are provided with a plurality of radially extending fins 24, 25. Short fins 24 alternate with relatively longer fins 25 as shown in FIG. 1. The fins 24 and 25 are equally arcuately spaced throughout an outer annular portion of the surface of each disc 11.

As also seen in FIG. 1 the heads of bolts 22 are located radially inward of ends of short fins 24 and between the inner ends of pairs of longer fins 25. The cross-sectional configuration of the finned discs 11 is shown in FIG. 3, where it can be seen that the disc 11 is not simply a flat plate, but is generally formed as a dish with a central circular opening for the shaft 23. This construction strengthens the base of the disc 11 by permitting greater disc thickness near the disc center. Each disc 11 has an inner annular lip portion 26, a slanted step portion 27 and a gradually outwardly tapered fin-carrying portion 28 extending to the periphery of the disc where the base plate of the disc is thinnest. The outer edges 24a and 25a of the fins 24, 25 generally follow the taper of the portion 28 of the disc from which the fins project normally. Fins 25 are shown to have a generally straight slanting inner edge 25b, whereas fins 24 have a S-shaped inner edge 24b as shown in FIG. 3.

The fin arrangement has been found to enhance air flow over the disc 11 when the disc rotates, and to eliminate obstacles to air flow for optimum cooling. The relatively high fins, which can be seen to project further from the surface of the disc than the thickness of the disc's base-plate also promote the flow of cooling air, while the tapered disc plate cross-section balances the need for strength against the objective of keeping disc mass low. This arrangement reduces turbulence and boundary layer obstruction to enhance the flow of cooling air over the disc and thus aids in heat dissipation.

It will also be seen that the slanting step portion 27 of the disc provides a slanted inner annular face area 29 which mates with a slanted or beveled outer surface 30 which extends around the circumference of the hub 21 at each outer side of the hub, adjacent a generally cylindrical face portion 31 of the hub.

The bolts 22 which secure the disc 11 to the hub 21 extend normally to the mating surfaces 29 and 30 through the slanted step portion 27 of the disc. This assures correct assembly of the discs 11 on the hub 21 and takes into account dynamic forces on the disc 11 when the hub and disc assembly is rotating rapidly. This arrangement also lends easy access to the heads of the bolts 22.

Figure 4:
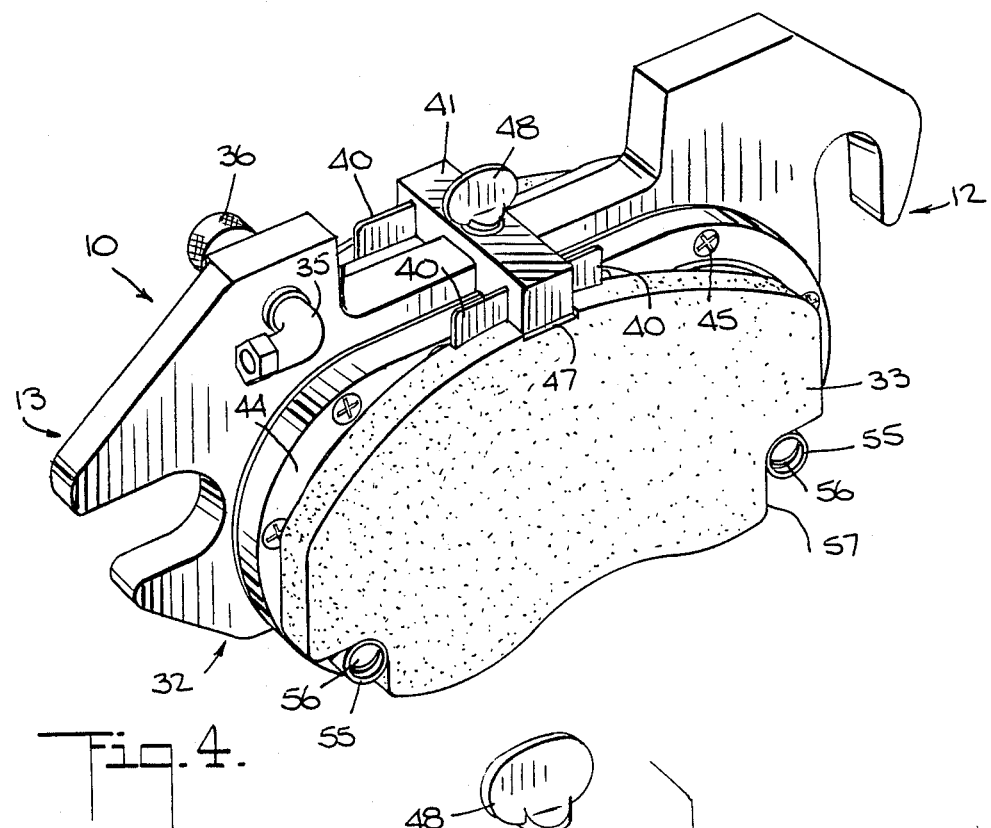
FIG. 4 is a view in perspective of another friction module of the invention.
Figure 5:
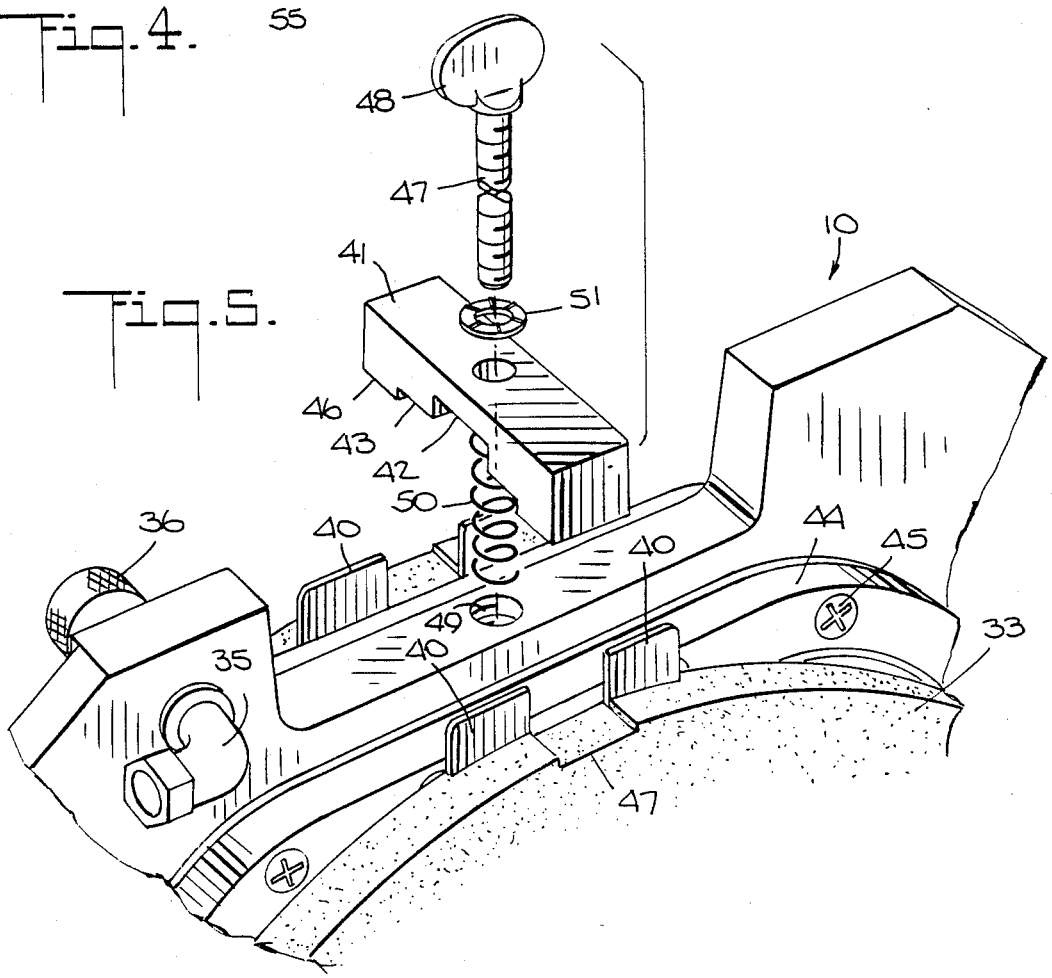
FIG. 5 is a detail view showing the thumbscrew and related parts of the friction module.

FIGS. 4, 5 and 6 show this form of novel friction module 10 of the invention in greater detail. The module 10 has a body 32 of metal such as aluminum or other suitable material, such as plastic, generally similar in overall shape to the modules illustrated in U.S. Pat. No. 3,964,583, but instead of having two pairs of discs of friction material on opposite sides, the module 10 has a single friction member 33, which is somewhat kidney-shaped, on each side for frictional engagement with the inner surface of an opposed disc 11. The friction pads 33 can be of any suitable known composition which is resistant to the heat generated upon engagement. When the brake or clutch is engaged a piston, generally similar in shape to the friction, pad 33, pushes the pad outward. As shown in FIG. 6 each piston has a piston front face plate 34, which is also generally kidney-shaped, for forcing the friction pad 34 against the opposed inner surface of a disc 11. Internally of the module 10 there may be, if desired, two through bores (not illustrated) for actuating piston movement, as in the actuating mechanisms of prior Montalvo patents aforementioned.

A fluid motor, or motors, behind each piston face plate 34 is supplied with air or other fluid under pressure from a source, (not shown), through an inlet 35 shown in FIGS. 4 and 5, which can suitably be equipped with a valve for pressure relief. The knurled knob of such a valve is illustrated at 36 in FIGS. 4–6. Piston and cylinder assemblies of a suitable type for use in the device of this invention have been described in Montalvo, Jr. U.S. Pat. No. 4,366,884, granted Jan. 4, 1983, except that in the case of the present invention the piston is not circular in section, but is kidney-shaped in cross-section like the friction pad 33 and plate 34. Such pistons are mounted back to back on the body 32 of each module 10. As in U.S. Pat. No. 4,366,884, there is a rolling diaphragm behind each piston face plate 34. The edge 37 of such a diaphragm is shown at 37 in FIG. 6 and the front edge of a 180° convolution of the diaphragm is shown at 38.

The fiction material of each friction pad 33, whether it be of a carbon/graphite base or of other suitable friction material having high heat resistance, will wear through use, and eventually each pad 33 will need to be replaced. Generally speaking, in the prior art, as illustrated by U.S. Pat. Nos. 3,696,900 and 3,964,583, some degree of disassembly of the brake or clutch was required for the replacement of worn friction pads. The present invention provides for inspection and replacement of the pads 33 without such disassembly, and without the use of any tools.

Each friction pad 33 has a metal back plate 39 generally conforming to the shape of the friction pad 33, but having a pair of tabs 40 which project beyond the edge of the pad 33 as shown in FIGS. 4–6 and also projecting beyond the radially outer edge of the piston front plate 34. Then tabs 40 can be gripped to slide the friction pad 33 out of its working position, as illustrated in FIG. 6. Normally the friction pad 33 is held in place as shown in FIG. 4 by a locking torque post 41, which is a generally bar-shaped member having a central transverse channel 42 which fits over the outer edge of the pod body 32 as shown in FIG. 4 and which preferably has a pair of stepped portions 43 which overlie the edge of an open kidney-shaped clamping frame member 44 which surrounds the front face 34 of the piston and clamps the edge 37 of the diaphragm in place by mean of screws 45. The bar-shaped post 41 has a leg 46 at each end for fitting into a cut-out channel 47 in the friction pad 33 to hold the pad 33 in place. While the structure illustrated is presently preferred some other types of releasable fastener might be used in certain applications.

The torque post 41 is held in place by a fastener such as the thumbscrew 47 shown which has a head 48 which an operator can grasp and turn to unscrew the thumbscrew 47 from a threaded hole 49 in the module body 32. A coil spring 50 under compression urges the torque post 41 to follow the thumbscrew 47 outwardly when it is unscrewed as shown in FIGS. 5 and 6. A washer 51 is shown between the head 48 of the thumbscrew 47 and the outer face of the torque post 41. Some other suitable form of fastener might be used in certain applications, with or without the coiled springs shown.

To remove the pads 33 from their operating position, it is merely necessary to unscrew the thumbscrew 47, and rotate the torque post from, the position shown in FIG. 4 to the position shown in FIG. 6 so that the pads 33 can be grasped by their projecting tabs 40 and slid outwardly. This is also illustrated in FIG. 2 showing the rotation of the torque post 41 in the direction of the arrows to the positions shown in dashed lines.

Another feature which may be noted is that there are two annular magnets 52 mounted in annular recesses 53 in the front face 34 of the piston to magnetically secure the metal back plate 39 of the pad 33 in place. The annular magnets 52 encircle the heads of rivets 54. Other means, such as disc-shaped magnets, or a different number of magnets could be used. Fixed torque posts 55 are secured by screws 56 to the front of the clamping frame 44. The posts 55 are received in cutouts 57 of the pad 33 and pad back plate 39 to prevent any motion of the pads 33 when the pads 33 frictionally engage the inner faces of the friction discs 11, but do not interfere with outward sliding removal of the pads 33 when the post 41 is rotated to unlock the pads 33 for removal.

Since the friction pads 33 can be readily removed without disassembly of the other working parts, the present invention permits the employment of a unitary friction module generally identified by reference numeral 60 and shown in FIG. 3. The module 62 has a plate-like body 61 with a plurality of bores 62 adapted to be supplied with fluid under pressure through channels 63 which extend radially outward within the body 61 from the bores 62.

The bores 62 effectively act as cylinders for fluid motors which serve to push the friction pads 33 outward for engagement with the finned plates 11. The structure of the piston assemblies is as already described with reference to the other drawing figures. The unitary module plate 61 has a plurality of slots 64 for receiving locking torque posts 41 as aforedescribed, and has a plurality of recesses 65 for securing the module 60 to mounting studs, similar to the studs shown in FIGS. 1 and 2, except that the FIG. 4 embodiment uses only three such mounting parts, not the four shown in FIG. 1. Clearly, another configuration of unitary module could accomodate a different number of friction pods and/or mounting posts from the three which would be employed in the embodiment of FIG. 4.

As shown in FIG. 3, the body 61 of the module 60 extends inwardly at 68. A shaft 69 extends outward from each side of the central portion 68 of the module 60, parallel to the axis of shaft 23. The shaft or pin 69 carries a small wheel or bearing 70 at each side of the module 60 to run in a machined groove 71 in the outer face 31 of the hub 21. The wheels 70 can have ball bearings or the like for smooth operation. This allows centered arrangement of the unitary module 60 between friction discs 11 and thereby facilitates rapid assembly of a brake or clutch employing such a unitary module. The embodiment of FIGS. 3 and 4 has the advantages of the assembly of the other figures which permits easy access to the friction pads 33.

It should be understood that the assemblies described whether employed as brakes or clutches can comprise a number of individual modules 10 greater or smaller than the four modules 10 illustrated, depending upon application requirements. One, two or three modules 10 or a number of modules greater than four could be employed. Also means for independently actuating the pistons and thereby pushing the friction pads 33 into engagement, can be employed, so that the number of pistons actuated can be all or a lesser number of the total pistons in a given assembly.

If a number of modules 10 different from the four shown is employed, the adapter members 15 could be modified accordingly, so that a single module 10 can be used in a wide variety of brake and clutch configurations.

Alternatively, the unitary module 60, with its wheels or bearings 70, is preferably employed in some applications.

The graph of FIG. 7 illustrates the improved heat dissipation achieved by use of the invention described and shown. The graph compares the heat dissipated (in horsepower) for different rates of disc revolution. The lowest graph (rated curve) shows heat dissipated for a prior art brake with friction pads which move outward to engage friction discs.

The middle curve (dashed line) is a theoretical (computer modeled) calculation of the performance which was expected of a brake according to the invention. The top curve, designated "test curve", shows the results of testing of a brake according to the invention. All curves represent brakes of the same diameter, and which are otherwise comparable. The brake constructed in accordance with the present invention is shown to be much more effective at dissipating heat than those of the prior art, and actually to outperform theoretical expectations.

These and other modifications and adaptations of the assembly shown and described will suggest themselves to those acquainted with the relevant art, and accordingly, are considered to be within the spirit and scope of the invention.

What is claimed is:

1. An assembly for use in a friction coupling mechanism of the type wherein relative rotation between two bodies is controlled by selective engagement of friction members, comprising a body carrying at least one friction member and a locking torque post extending transversely across said body and normally holding said friction member in a working position, said torque post being releasable from a locking position and movable to allow sliding removal of the friction member and wherein said torque post is secured to said body by a thumbscrew which can be manipulated to release said torque post from its locking position without removal of the thumbscrew.

2. The assembly of claim 1 wherein the body has a friction member on each of two opposite sides of the body and said torque post straddles the body and holds both friction members in position, said torque post being releasable from its locking position and rotatable into alignment with the body for sliding removal of the friction members.

3. The assembly of claim 1 or 2 wherein the friction member has at least one protruding tab for pulling the friction member slidingly away from its working position.

4. A brake or clutch having a pair of spaced, opposed friction discs and a module carrying a pair of back-to-back pistons positioned between said friction discs for forcing friction members into contact with said discs to engage the brake or clutch, said friction members being normally held in working position in front of each piston by a torque post, said torque post being movable to release said friction members for removal of the friction members from said working position said friction members being generally kidney-shaped pads with cut out portions to receive posts which prevent undesired movement of the pads and said pistons being generally kidney-shaped in cross-section.

5. The brake or clutch of claim 4 wherein said torque post is movable from a locked position straddling a body of said module to an unlocked position in alignment with the body of said module.

6. The brake or clutch of claim 4 which has more than one module carrying back-to-back pistons positioned between friction discs.

7. In a brake or clutch of the type having a pair of spaced, opposed friction discs for engagement by outward motion of friction members located between inner faces of the friction discs, a hub upon which said discs are mounted for rotation with an axial shaft, said hub having beveled surfaces which are at an acute angle with respect to the axis of said shaft and said discs being secured to said hub by fasteners passing through said discs perpendicularly to said beveled surface.

8. The assembly of claim 7 wherein each disc has a surface lying at an acute angle to said shaft axis for mating with the beveled surface of said hub.

9. The assembly of claim 8 wherein each disc has a multiplicity of radially extending fins on an outer disc face.

10. The assembly of claim 9 wherein one set of said fins have inner edges generally adjacent said fasteners and another set of said fins which alternate with the fins of said one set have inner edges which are located radially outward of said fasteners.

11. The assembly of claim 8 wherein said discs taper outwardly from a relatively thick disc cross-section near said hub to a relatively thinner disc cross-section at the disc circumference.

12. In a friction coupling mechanism of the type having a pair of opposed friction discs secured by a hub to a shaft for rotation with the shaft and at least one pair of back-to-back pistons arranged between inner surfaces of said discs for urging friction members into engagement with said inner disc surfaces, a module carrying said pistons having a plurality of bearing means for rolling alignment on said hub between said discs wherein each said bearing means includes shaft means and wheels on said shaft means on opposite sides of said module for contacting grooves in an outer, generally cylindrical surface of said hub.

13. A friction coupling mechanism for regulating relative rotational motion between two bodies comprising: a shaft; a hub mounted on said shaft for rotation therewith, said hub having a generally cylindrical outer surface concentric with said shaft and beveled surfaces tapered toward said shaft; a pair of finned friction discs mounted on said hub by fasteners at said beveled hub surfaces, said friction discs being tapered in a radially outward direction from said hub; and at least one module carrying a pair of back-to-back piston assemblies for forcing friction members into contact with inner surfaces of said discs, said friction members being slidably releasable from a working position facing said discs for removal of the friction members.

14. The mechanism of claim 13 wherein said friction members are normally held in working position by a torque post which straddles a body of said module, said torque post being movable to a position aligned with said module body for releasing said friction members for sliding removal thereof.

15. The mechanism of claim 13 wherein there are a plurality of modules carrying friction members.

16. The mechanism of claim 13 wherein said friction members are generally flat pads of friction material which are kidney-shaped in outline and said pistons conform to the kidney-shaped outline of said pads.

17. The mechanism of claim 16 wherein said pads have tab means for facilitating sliding removal thereof.

* * * * *

UNITED STATES PATENT AND TRADEMARK OFFICE
CERTIFICATE OF CORRECTION

PATENT NO. : 4,860,865

DATED : August 29, 1989

INVENTOR(S) : William W. Montalvo, III et al

It is certified that error appears in the above-identified patent and that said Letters Patent is hereby corrected as shown below:

Column 5, lines 26-45:

from: "The module 62" to "of Fig.4" should be deleted.

Signed and Sealed this

Twenty-eighth Day of August, 1990

Attest:

HARRY F. MANBECK, JR.

*Attesting Officer*      *Commissioner of Patents and Trademarks*